United States Patent [19]
Kobayashi

[11] 3,789,899
[45] Feb. 5, 1974

[54] PNEUMATIC TIRES
[75] Inventor: Takashi Kobayashi, Fujisawa, Japan
[73] Assignee: The Yokohama Rubber Company, Limited, Tokyo, Japan
[22] Filed: June 12, 1972
[21] Appl. No.: 261,675

[30] Foreign Application Priority Data
June 12, 1971  Japan.............................. 46/41409

[52] U.S. Cl. ............................ 152/356, 152/362 R
[51] Int. Cl. ......................... B60c 9/02, B60c 15/04
[58] Field of Search ... 152/352, 354, 355, 356, 357, 152/359, 361 R, 362 R

[56] References Cited
UNITED STATES PATENTS

| | | | |
|---|---|---|---|
| 1,641,792 | 9/1927 | Trotter............................... | 152/359 |
| 3,269,444 | 8/1966 | Willis............................. | 152/362 R |
| 3,244,214 | 4/1966 | Bush.................................. | 152/354 |
| 1,400,269 | 12/1921 | Darrow................................ | 152/356 |
| 2,939,502 | 6/1960 | Hindin et al........................ | 152/352 |
| 3,161,220 | 12/1964 | Beckadolph....................... | 152/356 |
| 2,945,525 | 7/1960 | Lugli.............................. | 152/361 R |
| 3,607,497 | 9/1971 | Chrobak......................... | 152/361 R |
| 2,688,983 | 9/1954 | Bowerman......................... | 152/356 |

Primary Examiner—Gerald M. Forlenza
Assistant Examiner—Robert Saifer
Attorney, Agent, or Firm—Armstrong & Wegner

[57] ABSTRACT

A pneumatic tire in which the tire is built by arranging a layer of an elastic material, such as rubber, radially outwardly of a reinforcement layer extending from one bead region to the other bead region of the tire and formed of at least one reinforcement member which has its one end located at either one of the bead regions and is wound up helically or circumferentially in a direction at an angle of 0° to 20° with respect to the rotating direction of the tire, whereby the number of the cut ends of said at least one reinforcement member is substantially decreased, the resistance of the tire to centrifugal force is increased over the entire area of the tire, the occurrence of steady wave is prevented and the tire withstands high speed rotation.

7 Claims, 15 Drawing Figures

PNEUMATIC TIRES

BACKGROUND OF THE INVENTION

This invention relates to pneumatic tires.

As is obvious, the rotating speed of a tire increases with the speed of the vehicle on which the tire is mounted and the force of radial expansion of the tire due to the centrifugal force becomes large in proportion to a square of speed. A tire capable of following the vehicle speed cannot be produced unless the circumferential rigidity of the tire is increased to the possible extent to raise the lower limit of speed at which steady wave occurs and the radius of curvature of the tire in the radial direction is made large to the possible extent.

It is expected that the vehicle speed will exceed 250 km/hour and reach as high as 500 km/hour in the near future. It has been found that, in this case, the configuration of the tire reaches 0.2–0.4 in terms of aspect ratio and a reinforcement member required as an internal reinforcement element of the tire is required to increase only the circumferential rigidity of the tire and the stresses acting in the radial direction of the tire are very small and of the order of 10–25 percent of the stresses which the presently used tires of an aspect ratio of about 0.8 are required to withstand, so that a material which will bind a rubber compound to some extent will be sufficient for use for additional reinforcement of the tire in the radial direction.

With the construction of the presently used radial tires, it is substantially impossible to prevent the occurrence of a steady wave at the maximum diameter portion of the side wall of the tire where a breaker layer is not present, i.e., the portion immediately below the tire shoulder, at speeds higher than 300 km/hour. Even when the tire is used at speeds below 300 km/hour, the side wall of the tire, except for a very small specific portion, need to be protected by a cord layer arranged in other than the radial direction. Under these circumstances, there is a tendency to change the tire construction from the radial construction to a carcass construction wherein cords are arranged in crossing relation, for increasing the speed capability of the tire.

In the speed region exceeding 300 km/hour, the conventional radial construction will be hazardous due to a steady wave, unless the internal pressure of the tire is increased to an extremely high level. But the radial construction does not have an element which solves this problem at the side wall of the tire connected to the shoulder, which is the weakest portion of the tire. Thus, another construction is called for which will overcome this disadvantage in the radial construction.

Another disadvantage in conventional tires is the danger inherent to a tire the separation of the reinforcement layer and the rubber compound due to a degradation of physical properties of the rubber compound, particularly the rubber compound connected to the reinforcement cord layer, caused by heat and to a degradation of bonding strength between the reinforcement layer and rubber compound.

Of particular importance is the separation of the reinforcement layer and the rubber compound due to the absence of an adhesive at the cut ends of the cords and a rigidity change of the cords at their ends even under the speed and load conditions of the presently used vehicles.

SUMMARY OF THE INVENTION

The present invention, therefore, contemplates the provision of a pneumatic tire which is characterized in that a tire reinforcement layer is arranged only in a direction perpendicular to the direction of deflection of the tire or only in the circumferential direction of the tire so as to substantially decrease the number of the cut ends of the reinforcement materials. The ends of the reinforcement materials imbedded in the bead portions where the deformation stresses are relatively small. This minimizes the effect of the stresses, caused by the internal strain of the tire, on the bonding strength between the cords and rubber compound. The tire having such a circumferentially arranged reinforcement layer will have a construction in which the rolling resistance is smallest and the concentration of stresses resulting from deflection of the tire is minimized, but the spring constant tends to increase.

According to this novel construction the reinforcement layer takes compressive forces in the longitudinal direction of the cords constituting the reinforcement layer, only when the tire is driven and braked. Therefore, it is not essential to arrange twisting cords helically in the circumferential direction and, in some cases, the tire can even be built simply by helically or circumferentially winding metal bands or sheets of a laminate consisting of a synthetic resin film and an elastic rubbery material, which are not highly resistive to compression fatigue. These helical or circumferential reinforcement bands or sheets are not necessarily arranged extending from the bead on one side to the bead on the other side of the tire, but may be arranged in two layers in such a manner that the reinforcement bands or sheets of one layer intersect those of the other layer at a small angle. At any rate, the tire of the present invention is characterized in that these cords of reinforcement members are arranged in or substantially circumferential direction of the tire and the ends thereof are mostly embedded in the bead regions or portions of the tire adjacent the bead regions. Namely, the centrifugal force of the tire increases with speed, and will increase even to a degree sufficient to support the load imposed on the tire. Therefore, the tire of the present invention is capable of preventing the occurrence of a steady wave. The internal pressure should be just enough to secure the lateral rigidity of the tire and there is no necessity for increasing the internal pressure to an excessively high level. The construction must be such that the load on the tire is supported without causing an excessively large deflection of the tire.

The centrifugal force F imposed on a tire is expressed by the formula, $$F = (W/g) \cdot (V^2/r)$$

wherein

W = the weight of the deflected tire portion by load,

V = the vehicle speed, r = the radius of the tire.

Suppose that the centrifugal force F is equal to the load G imposed on the tire, under the conditions that G = 800 kg, V = 250 km/h ÷ 69 m/sec and r = 0.35 m, $$800 = (69^2/0.35) \cdot (W/9.8)$$

and hence $$W = 0.576 \text{ kg.}$$

Namely, the weight imposed on the deflected portion of the tire is 0.576 kg. When the ground-contacting angle of the tread surface of the tire, which is actually deflected (the angle defined by two straight lines connecting the opposite ends of the ground-contacting length of the tread with the center of the axle) is 30° and the weight of the deformed portion, capable of taking the load G, of the tire having a total weight of 10 kg, that is, the weight of the entire circumferential portion of the tire associating with the centrifugal force, is 7 kg, $$7 \times (30/360) = 0.58.$$

Namely, W of 0.58 kg can be expected.

The above calculation has the following significance: Namely, if the ground-contacting angle of 30° can be maintained during running of the tire along a straight line at a speed of 250 kg/h, as mentioned above, only by the centrifugal force the tire would be able to support the total load thereof, during running, even if the internal pressure thereof is 0.

Now, let's consider the case in which a vehicle with the conventional tires travels at the normal speed. When W is calculated from the formula given above under the conditions that the running speed of the tire = 125 km/hr, the load imposed on one tire = 400 kg, the radius of the tire = 0.3 m, the total weight of the tire = 7 kg, the weight of the tire portion radially displaced due to deflection of the tire, which is obtained by integrating the total weight of the tire, that is, 7 kg over the entire circumference of the tire = 5 kg and the ground-contacting angle = 30°, the calculation result shows that, while W required for supporting the load, imposed on one tire by the centrifugal force only is 0.986 kg, W of 0.41 kg can only be expected for the tire described above. In other words, under the conditions set forth above, the load which must be supported by the internal pressure and the rigidity of the tire is $$400 \text{ kg} \times (0.986 - 0.41/0.986) \doteq 234 \text{ kg.}$$

However, during actual running of the tire, the deflection of the tire is variable depending upon the interrelating bearing force of the centrifugal force, bearing force of the tire internal pressure and bearing force of the tire rigidity. These three component forces undergo the influence of temperature change at each portion of the tire.

Namely, deflection of the tire during running at a low speed decreases with the speed increasing and, when the tire is repeatedly subjected to such deflection, the shearing, compressive and tensile stresses and strains in the interior of the tire change at a cycle proportional to the speed. The energy loss attributable to such changes results in generation of heat which accelerates the fatigue destruction of the tire.

In a bias tire or radial tire in which complicated internal stresses occur, the weak points of the tire, such as the shoulders and the upper portions of the beads, are subjected to fatigue destruction more quickly as the speed and hence the deflection of the tire increases, due to the increases of the internal stresses and strains.

Therefore, in order for the conventional tires to be durable with high speed running, it becomes necessary to minimize the tire deflection by increasing the internal pressure and thereby minimizing the changes of stresses and strains occurring by reason of the construction of the tires. This means that the bearing capacity of the centrifugal force is wastefully decreased and the dynamic spring constant of the tire is undesirably made extremely large.

In the tire according to the present invention, the internal stresses due to deflection of the tire are very simple and there is no point where the stresses are concentrated, thus it is unnecessary to make the tire's internal pressure particularly high during running at high speeds. Therefore, the tire of the invention has the advantages that the bearing capacity of the centrifugal force can be effectively utilized during the running the of the tire at high speeds and that the dynamic spring constant of the tire can be maintained at an unexpectedly low level during running of the tire at high speeds.

The construction of the tire according to the present invention having reinforcement materials wound at an angle of 0°–20° to the circumferential direction of the tire from the tire beads over the side walls, shoulders and crown of the tire, provides no cause of stress-strain concentration.

Further, in the tire of the present invention the expansion of the tire under the influence of centrifugal force is prevented by the circumferential reinforcement members as opposed to radial tire the side walls of the tires in which expands outwardly under the influence of centrifugal force, with the results that the tire deforms into a substantially square cross section, with strong stress concentration occuring at the shoulders and the shoulder surfaces of the tire tread being subjected to an abnormally high pressure.

From the foregoing description, the total load G imposed on a tire may be expressed approximately by the following simple formula:

$$G = (w_1/g) \cdot (V^2/r) + PA + R \ldots \quad \text{(A)}$$

= the load borne by centrifugal force + the load borne by the tire internal pressure + the load borne by the tire rigidity wherein
V = the vehicle speed,
r = the radius of the tire,
P = the tire internal pressure,
A = the effective pressure receiving area of the tire deflected surface,
R = the repulsive force of the tire resulting from the tire rigidity when the tire is deflected. The vertical spring constant K of the tire is expressed by a partial differential value of the load G with respect to rising direction of deflection (X) of the tire. Namely, $$K = (V^2/gr) \cdot (\delta W_1/\delta x) + A(\delta P/\delta x) + P(\delta A/\delta x) + (\delta R/\delta x) \ldots \quad \text{(B)}$$

In comparing the tire of the present invention and the conventional tires in terms of formula (A), in the former less heat is generated due to deflection and hence the internal pressure P is lower than in the latter. Accordingly, in case of the tire of this invention the first term is larger and the second term is smaller than in case of the conventional tires. Further, the third term in case of the present invention becomes smaller with the temperature, whereas in case of the conventional tires it becomes larger with the speed increasing. Still further, in case of the tire of this invention the load bearing capacity can be increased by increasing the internal pressure P of the tire. In this sense, it may be said that the tire according to this invention is of a construction having excess load bearing capacity.

With regard to formula (B), it is important to make the first term small for improving the riding comfort of the passenger during travel of the vehicle at high speeds. Namely, it is essential to reduce the amount of change $\Delta W_1$ with respect to unit deflection $\Delta x$. This in turn makes it necessary to minimize the weight of the portion where the radius of rotation is large and to minimize the weights of not only the tire tread portion but also the reinforcement layer.

The most effective way of using the reinforcement members with respect to large centrifugal force is to arrange the reinforcement members at an angle close to 0°, and this is particularly important where the reinforcement materials used have a large specific gravity. It can be said that the construction of the tire according to this invention is adequate also from the standpoint of decreasing the spring constant during running at high speeds.

As described above, the tire of the present invention is characterized by the high level of steady wave generating speed, generation of a small amount of heat, excess load bearing capacity, and steady spring constant at high speeds and stable operation at high speeds. These characteristic features of the tire construction according to the invention produce a tire which will take the place of the radial tire in the future when the vehicle speed is high.

The object of the present invention is to provide a pneumatic tire in which the tire is built by arranging a layer of an elastic material, such as rubber, radially outwardly which respect to a reinforcement layer extending from the bead region on one side to the bead region on the other side of the tire and formed of at least one reinforcement member. At least one reinforcement member has its one end located at either one of the bead regions and is wound in a direction at an angle of 0°–20° with respect to the direction of rotation of the tire. In this manner resistance to centrifugal force is increased over the entire region of the tire and the generation of a steady wave is prevented.

The tire of the construction according to this invention, in practice, can simultaneously have a very excellent cornering characteristic and because of the strong tension acts on the reinforcement members, constituting the circumferentially arranged reinforcement layer, of the tire when the tire is subjected to lateral deformation, since the lateral deformation occurs only in a direction to stretch each portion of the tire in the circumferential direction.

The only problem in this tire is that substantially no reinforcement members act to reinforce the tire against the forces created by the internal pressure to the tire, which act tangentially of the tire cross section expanding the tire in the widthwise direction. When the tire is used for the purposes for which a high internal pressure of the tire is required, e.g. for trucks, it becomes necessary to provide auxiliary reinforcement means such, a combination of an elastic material and a cellulose-reinforced compound in which the cellulose fibers are mainly oriented in a radial direction of the tire. The above-mentioned problem may be solved to some extent by providing a cord layer extending from the left side bead to the right side bead of the tire and another cord layer superimposed on said first cord layer and extending from the right side bead to the left side bead of the tire, with the constituent cords of said respective cord layers crossing each other at a small angle, or by providing such cord layers in more than two layers in the manner described. In this specification the term "cellulose-reinforced compound" means a compound into which a plurality of cellulose fibers are incorporated in spaced relation with each other.

By arranging the reinforcement layers in a multiplicity of layers, without using any special metallic bead construction, beads can be formed with the same material as the reinforcement material for the carcass and crown in the same step. This is advantageous in that, in the production of the tire of this invention, the carcass and breaker of the tire can be formed by an automatic tape winding method and the tape winding method can also be employed for the formation of the tread of the tire. Thus, all of the tire-building materials can be supplied in the form of a tape and the tire can be built with only the a tape-winding operation. This enables complete automatization of the tire building system or semiautomatization of the same in which one worker attends to a plurality of tire building sets. The shape of a tire can be changed by simply changing the shape of a tire building drum drastically from that of the conventional one, when manual labor has to be limited to a minimum due to shortage of the working population. Such advantage of the present invention is quite important in the light of the fact that, under the present circumstances, the radial tires presently used can be produced by apparatus which is most difficult to automate and bias tires can be produced by apparatus, the complete automation of which is also very difficult. In the automatic production of the tire of this invention, the tire building drum used will be of the shape of the tire in which the portions corresponding to the beads are expanded in the widthwise direction of the tire, and the outer diameter of the tire after building will be very close to the outer diameter of the tire after vulcanization.

For vulcanization of the tire, a sectional must be used so that the tire may be clamped between the mold parts which are moved toward the tire externally, this is necessary because the outer diameter of the unvulcanized tire is so close to the outer diameter of the tire after vulcanization and otherwise the expansion of the outer diameter of the tire would be extremely interfered by the reinforcement layer. The number of the parts of this sectional need to be as large as possible.

BRIEF DESCRIPTION OF THE DRAWING

Other objects, features and advantages of the present invention will become apparent from the following detailed description when taken in conjunction with the accompanying drawings, in which:

FIGS. 9 and 10 exemplify the building drum used in the making of the tire of this invention, of which FIG. 9 is a perspective view showing the outline of the building drum and FIG. 10 is a vertical sectional view thereof;

FIGS. 12-15 show different modes of winding of the reinforcement member according to the invention, of which FIG. 12 is a perspective view showing the basic mode of winding; FIG. 13 is a perspective view showing the reinforcement member being wound helically to form a carcass layer and being wound zigzag to form a breaker layer; FIG. 14 is a model view showing the reinforcement member being wound in such a manner that the individual lengths of the reinforcement member intersect at an angle of $2\alpha$; and FIG. 15 is a perspective view showing a plurality of the reinforcement members concurrently being wound from the bead of the tire.

DESCRIPTION OF THE PREFERRED EMBODIMENT

Describing the present invention in detail with reference to the drawings, the cord- or tape-like reinforcement members 1, 1', 1'' and 1''' used in the present invention are composed of a core 1A or 1B of a material having a low elongation, such as steel, textile or light alloy, and a sheath 2 of an elastic material, such as rubber, enclosing said core, as shown in FIGS. 5 to 8. At least one of these reinforcement members is helically or circumferentially wound on an elastic inner liner 3 such as of rubber (FIG. 1) by suitable guide means in such a manner as shown in FIG. 2, namely in a manner to extend from the bead region on one side to the bead region on the other side of the tire, at an angle of 0°-20° to the rotating direction of the tire, thereby to form a reinforcement layer. Further an elastic band 4 (FIG. 1) such as a rubber band is wound up on top of said reinforcement layer to constitute the tread of the tire, whereby an unvulcanized tire is completed.

Figure 1:
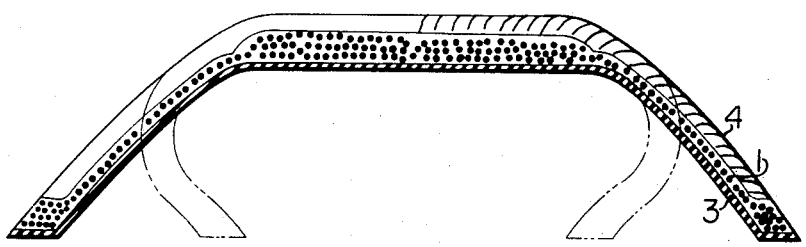
FIG. 1 is a sectional view of an embodiment of the tire according to the present invention comprising the reinforcement member shown in FIG. 5, in the stage after making but before vulcanization.
Figure 2:
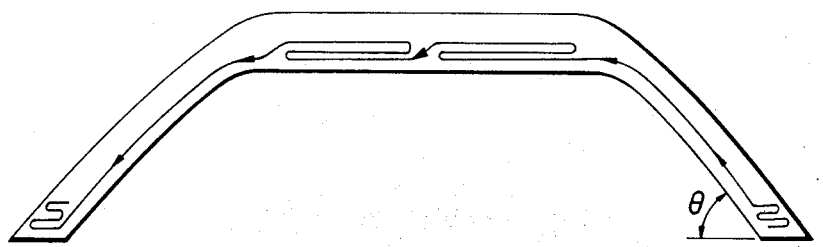
FIG. 2 is a diagrammatical view illustrating the manner of winding the reinforcement member, shown in FIG. 1, in the circumferential direction of the tire from the bead region on one side toward the bead region on the other side of the tire.
Figure 5:
FIGS. 5-8 are sectional views of different reinforcement members used in the tire of this invention, respectively.

FIG. 1 shows in cross section an unvulcanized tire which was made using, for example, the reinforcement member shown in FIG. 5. The side wall portions of the tire are bent as indicated by the phantom line when the tire is vulcanized in a sectional mold, whereby a complete tire is built.

Figure 3:
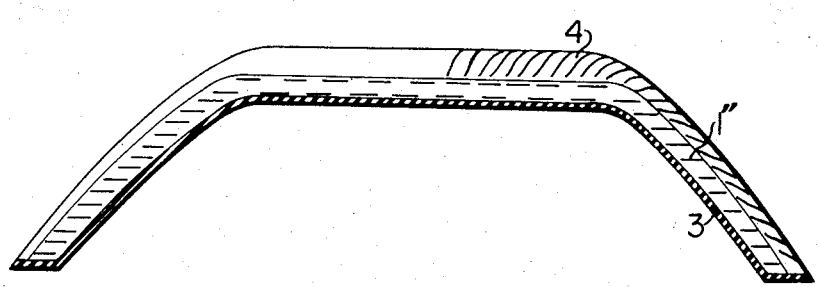
FIG. 3 is a sectional view of another embodiment of the tire of this invention comprising the reinforcement member, shown in FIG. 7 or 8 and having a substantial width, in the stage after making but before vulcanization.
Figure 4:
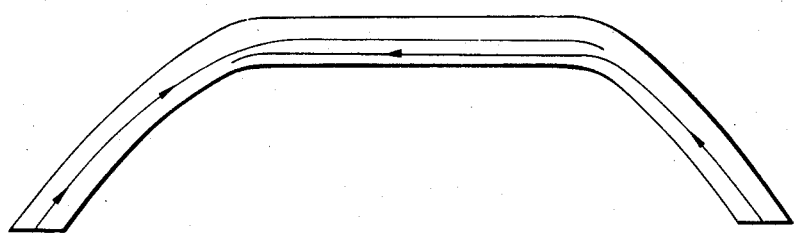
FIG. 4 is a diagrammatical view illustrating the manner of winding the reinforcement member shown in FIG. 3.
Figure 7:
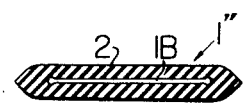
Figure 6:
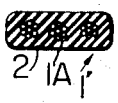
Figure 8:
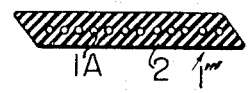

FIG. 4 shows the other procedure of applying the reinforcement member, and FIG. 3 shows an unvulcanized tire made using, for example, the reinforcement member shown in FIG. 7 which is applied according to the procedure shown in FIG. 4. In the embodiment shown in FIG. 3, the side walls of the tire are each provided therein with one reinforcement layer and the crown region thereof with two reinforcement layers, each of which reinforcement layers is formed by the reinforcement member 1'' helically wound to extend from the bead region on one side to the shoulder region on the other side of the tire.

Figure 9:
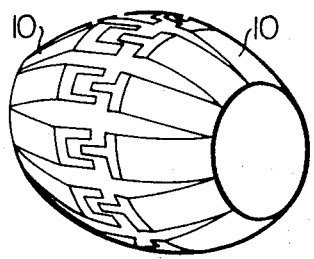
Figure 10:
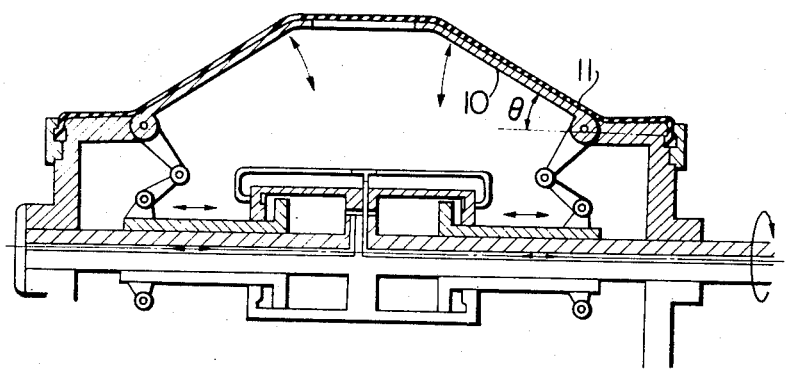

FIG. 2 shows an example of the reinforcement member winding method to form the reinforcement layers which constitute a part of the cross section of the tire shown in FIG. 1. In order to make such arrangement of reinforcement member possible, a building drum is required which makes the tire in such a shape that the tire has conical side walls having a mild angle of inclination $\theta$ (FIG. 2) and a cylindrical crown. For ease in building the tire, the angle $\theta$ preferably does not exceed 50° at largest. This drum is composed, for example, of two substantially conical, auto-collapsible sectional movable parts 10 which can be opened into the shape of an umbrella and adapted to be combined together. Projections formed at one end of one of them are received in corresponding notches formed in the facing end of the other one, as shown in FIGS. 9 and 10. A rubber bladder 11 is superimposed on the outer surface of the sectional movable parts as shown in FIG. 10, so as to facilitate the winding of the reinforcement material and removal of the shaped tire, e.g. the unvulcanized tire of the type shown in FIG. 1, from the mold.

Figure 11:
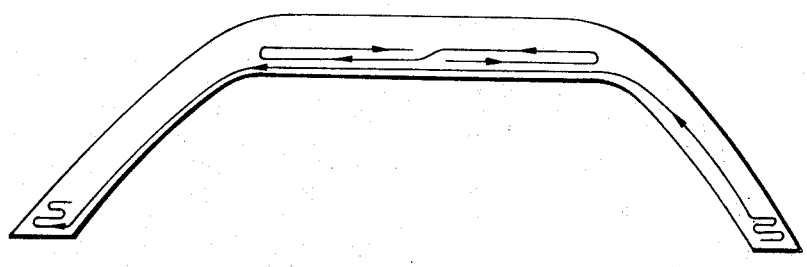
FIG. 11 is a diagrammatical view illustrating the manner of winding the reinforcement member to form a breaker layer and a carcass layer separately in another embodiment of the invention.

The use of a cellulose-reinforced compound elastic reinforcement material for the liner 3 shown in FIGS. 1 and 3, the use of a cellulose-reinforced rubber material for the elastic rubber material 2 shown in FIGS. 5, 6, 7 and 8, and the use of a cellulose-reinforced rubber material for the tread-forming elastic material 4 shown in FIGS. 1 and 3, to further reinforce the tire in the radial direction, are of course included within the scope of this invention as modifications thereof. A construction gf the tire in which the carcass and breaker are constituted by a separate cord- or tape-like reinforcement member is also included within the scope of this invention, and an example of such construction is shown in FIG. 11.

Although various combinations of directions in which the reinforcement members are arranged are considered, it is practical according to the invention to arrange the carcass layer-forming reinforcement member at an angle of 0°-20° and the breaker layer-forming reinforcement member at an angle of 0°-20° with respect to the circumferential direction of the tire.

Figure 12:
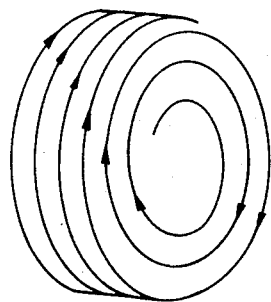
Figure 13:
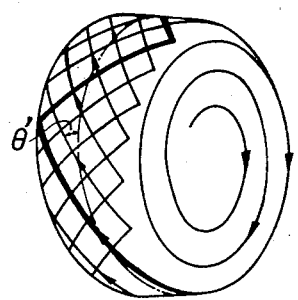

Namely, FIG. 12 shows the case wherein the carcass and breaker layers are at an angle of or close to 0° and FIG. 13 shows the case wherein the carcass layer is at an angle of or close to 0° and the breaker layer-forming reinforcement member is at an angle of $\theta'$ (about 15°) to the mid-circumferential plane and further the carcass and breaker layers are integrally connected with each other.

Figure 14:
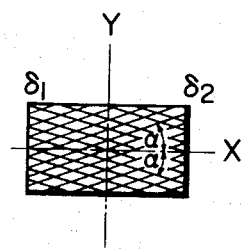

It is very important to arrange the reinforcement member of the carcass and breaker layers at an angle not greater than 20° to the circumferential direction of the tire. This is because of the following reason: Namely, when the Young's modulus of a laminate consisting of the reinforcement layers formed by intersecting reinforcement cords is considered with reference to a model shown in FIG. 14 and with $2\alpha$ representing the angle of intersection of the cords $\sigma_1$, $\sigma_2$ representing the stresses of the cords, $\epsilon$ representing the strain of the model, $\bar{E}$ representing the equivalent Young's modulus of the elastic material and the thickness of the cords being ignored, $$\sigma_x = \bar{E}(\epsilon_x + (1/2)\epsilon_y) + (\sigma_1 + \sigma_2)\cos^2\alpha$$

$$\sigma_y = \bar{E}(\epsilon_y + (1/2)\epsilon_x) + (\sigma_1 + \sigma_2)\sin^2\alpha$$

$$\tau_{xy} = (\sigma_1 - \sigma_2)\sin\alpha\cdot\cos\alpha$$

and when the infinitesimals of higher order are ignored, considering the cords as being inextensible, $$\epsilon_x\cos^2\alpha + \epsilon_y\sin^2\alpha = 0.$$

Therefore, $$\nu_x = -\epsilon_y/\epsilon_x = \cot^2\alpha$$

$$\nu_y = \tan^2\alpha$$

Further, considering that the tension in the direction of X axis is uniform, and that $\sigma_y = \tau_{xy} = 0$, $$\sigma_x = \bar{E}\epsilon_x(1 - \cot^2\alpha + \cot^4\alpha)$$

Also, from the Hook's law, $$\epsilon_x = 1/E_x\,\sigma_x - \tau_y/E_y\,\sigma_y$$

$$\epsilon_y = 1/E_y\,\sigma_y - \tau_x/E_x\,\sigma_x$$

Therefore, $$E_x = \sigma_x/\epsilon_x = \bar{E}(1 - \cot^2\alpha + \cot^4\alpha)$$

Similarly, $E_y = \bar{E}(1 - \tan^2\alpha + \tan^4\alpha)$
When the values of $\alpha$, $E_x/\bar{E}$ and $E_y/\bar{E}$ are calculated from the foregoing equation,

| $\alpha$ | $E_x/\bar{E}$ | $E_y/\bar{E}$ |
|---|---|---|
| 15° | 181.056 | 0.933 |
| 17° | 104.759 | 0.915 |
| 20° | 50.435 | 0.885 |
| 25° | 17.551 | 0.681 |
| 30° | 6.999 | 0.778 |

However, the experiment revealed that the binding force against the increasing centrifugal force is insufficient when the value of $E_x/\bar{E}$ is smaller than 50 and the value of $E_x/\bar{E}$ is preferably more than 100. In this sense, it is preferable that the angle of the reinforcement member to the circumferential direction of the tire is preferably 17° or smaller.

Figure 15:
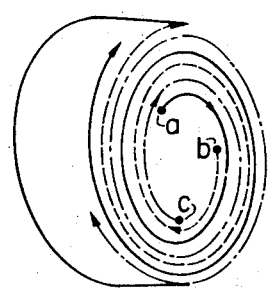

Although in the embodiments shown, only one cord or reinforcement band is wound up, it should be understood that a plurality of the reinforcement bands may be concurrently wound helically with their ends located at the bead region of the tire, as shown in FIG. 15 in which the reinforcement bands are concurrently wound up from three points $a$, $b$, $c$. In this case, three reinforcement layers are formed at the crown and one reinforcement layer at each side wall of the tire in one step of winding the reinforcement band from the bead on the right side to the bead on the left side of the tire.

What is claimed is:

1. A pneumatic tire in which the tire is built by arranging a layer of an elastic material, such as rubber, radially outwardly of a reinforcement layer extending from the bead region on one side to the bead region on the other side of the tire and formed of at least one reinforcement member, said at least one reinforcement member having at least one end thereof forming a bead member and being wound up in a direction at an angle of 0°–20° to the rotating direction of the tire wherein said bead member and reinforcement member are continuous whereby the resistance of the tire against centrifugal force is increased over the entire region of the tire and the occurrence of a steady wave is prevented.

2. A pneumatic tire as defined in claim 1, wherein each of said at least one reinforcement member is composed of a core of a material having low elongation and a sheath of an elastic material enclosing said core, and is in the shape of a cord or tape.

3. A pneumatic tire as defined in claim 1, wherein said at least one reinforcement member is wound in a multiplicity of layers at the bead regions of the tire to form said bead members.

4. A pneumatic tire as defined in claim 1, wherein there is provided an inner liner located radially inwardly of and extending along said reinforcement layer and serving as guide means in the winding operation of said reinforcement member, said inner liner consisting of an elastic material into which a plurality of cellulose fibers are incorporated in spaced relation with each other.

5. A pneumatic tire as defined in claim 1, wherein at least one of said reinforcement members is wound up at the crown region of the tire located radially outwardly of said reinforcement layer, to form an additional reinforcement layer.

6. A pneumatic tire as defined in claim 1, wherein the aspect ratio of the tire lies within the range of 0.2–0.4.

7. A pneumatic tire in which at least one reinforcement member extending from the bead region on one side to the shoulder region on the other side of the tire and at least one reinforcement member extending from the bead region on said other side to the shoulder region on said one side of the tire are respectively wound up at an angle of 0° – 20° to the rotating direction of the tire to form a reinforcement layer, and at least one bead member wherein the bead member and reinforcement member are continuous, said second-mentioned at least one reinforcement member being superimposed on said first-mentioned at least one reinforced member at the crown region of the tire, and a layer of an elastic material, such as rubber, is arranged radially outwardly of said reinforcement layer, whereby the resistance of the tire to centrifugal force is increased over the entire region of the tire and the occurrence of steady wave is prevented.

* * * * *